United States Patent Office
3,773,742
Patented Nov. 20, 1973

3,773,742
TETRANEOPENTYLTITANIUM AND USE AS POLYMERIZATION CATALYST
Walter M. Kruse, Wilmington, Del., assignor to Hercules Incorporated, Wilmington, Del.
No Drawing. Original application Feb. 2, 1971, Ser. No. 112,017, now Patent No. 3,712,874. Divided and this application May 22, 1972, Ser. No. 255,886
Int. Cl. C08f 1/30, 1/42, 3/06
U.S. Cl. 260—94.9 B      8 Claims

ABSTRACT OF THE DISCLOSURE

A new and stable organotitanium compound, tetraneopentyltitanium, is described. This new tetraalkyltitanium can be used as the sole catalyst for the polymerization of 1-olefins or it can be used in combination with an activator such as an organo-aluminum compound, preferably a dialkylaluminum halide. It can also be extended on a solid support such as silica and used, with or without an activator, as the catalyst for olefin polymerizations.

---

This is a division of application Ser. No. 112,017, filed Feb. 2, 1971, now U.S. Pat. 3,712,874.

This invention relates to a new organotitanium compound and more particularly to a stable tetraalkyltitanium compound and to its use as a catalyst for the polymerization of 1-olefins.

It is well known that tetraalkyltitanium compounds such as tetramethyltitanium and tetraethyltitanium are extremely unstable compounds, existing only at −50° C. or lower. In fact, tetramethyltitanium starts to decompose at −78° C.

Now in accordance with this invention, tetraneopentyltitanium, i.e., tetra(2,2-dimethylpropyl)titanium, has been prepared, which compound is surprisingly stable at room temperature and in fact can be purified by sublimation at 70° C. under high vacuum.

Tetraneopentyltitanium can be prepared by reacting a titanium halide, such as titanium tetrachloride, with neopentyllithium in an inert hydrocarbon diluent such as pentane, at low temperature (−78° C.) After removing any unreacted lithium alkyl, the tetraneopentyl compound is isolated by evaporating the diluent from the yellow solution. The residue sublimes at 70° C. under high vacuum to yield the bright yellow solid which has been identified as tetraneopentyltitanium.

This new alkyltitanium compound is thermally quite stable. It melts at about 60° C. and at about 100° C. the yellow liquid turns brown. In solution it is necessary to heat it to above 100° C. to get reasonable rates of decomposition. Consequently the compound is readily handled and stored and hence a very useful alkyltitanium compound. The compound is soluble in both polar and nonpolar organic solvents. Tetraneopentyltitanium is very sensitive to oxygen. Hydrolysis after reaction with oxygen yields neopentyl alcohol, whereas hydrolysis without exposure to oxygen yields neopentane.

The following example illustrates the preparation of tetraneopentyltitanium.

EXAMPLE 1

Neopentyllithium was prepared by reacting neopentyl chloride with lithium wire in pentane in a 1:2 molar ratio, while stirring the mixture for 6 hours at 70–80° C.

To a solution of 5 millimoles of $TiCl_4$ in 100 ml. of pentane at −78° C. and under vacuum was added 40 ml. of a 0.5 M solution of neopentyllithium in pentane. The reaction mixture was allowed to warm and at −50° C., carbon dioxide was added to precipitate unreacted alkyllithium. After centrifuging, the supernatant liquid was separated and evaporated to dryness under vacuum. The light brown residue was transferred under argon to a sublimer. It sublimed at 70° C. under high vacuum. The bright yellow solid so obtained amounted to a yield of 40% based on the titanium tetrachloride used. Analysis showed the product to contain 14.04% Ti; theory for $(C_5H_{11})_4$ Ti is 14.43%. Infrared and nuclear magnetic resonance data showed that the neopentyl groups are directly attached to the titanium and that the titanium is tetravalent.

\* \* \* \* \*

The tetraneopentyltitanium of this invention is an outstanding catalyst for the polymerization of 1-olefins. Any 1-olefin can be polymerized with this catalyst as, for example, ethylene, propylene, butene-1, hexene-1, octene-1, etc., and mixtures of these olefins. The tetraneopentyltitanium can be used as the sole catalyst or it can be used in combination with an activator, as, for example, an aluminum alkyl. Any organoaluminum compound having the formula

where R is an alkyl, alkenyl, cycloalkyl, aryl, aralkyl, alkaryl, etc. group and X and Y are R (which can be the same or different), halide, H alkoxide, etc., can be used as the activator. Of particular importance are the dialkylaluminum halides. Exemplary of the organoaluminum compounds that can be used are trimethylaluminum, ethylaluminum dichloride, diethylaluminum chloride, triethylaluminum, triisobutylaluminum, diisobutylaluminum hydride, ethylaluminum sesquichlorides, trioctylaluminum, tridodecylaluminum, aluminum isoprenyl, triphenylaluminum, tribenzylaluminum, tri(cyclohexyl)aluminum, etc. The amount of activator, when used, can be varied widely, but generally will be such that the molar ratio of aluminum compound to titanium compound will be within the range of from 0.5:1 to 100:1, and preferably from 1:1 to 10:1.

The polymerization can be carried out as a batch or continuous process. Generally it is carried out in the presence of a liquid diluent such as a liquid hydrocarbon, which can be any aliphatic, cycloaliphatic or aromatic hydrocarbon that is free of ethylenic unsaturation, as for example, pentane, hexane, heptane, isooctane, decane, cyclohexane, benzene, toluene, xylene, etc. The polymerization can be carried out as a solution or slurry process, by operating at a temperature above or below the temperature at which the polymer dissolves.

The tetraneopentyltitanium can also be extended on a solid support and used as the catalyst for the polymerization process. Any oxidic carrier material can be used as the support as, for example, any silica, alumina, thoria, titania, etc., particulate material as well as the mixed aluminosilicates. The carrier can be impregnated and/or reacted with tetraneopentyltitanium in a variety of ways. One of the simplest methods is to mix a hydrocarbon solution of the titanium compound with the oxidic material and then remove the hydrocarbon diluent. The amount of the titanium compound on the carrier can be varied widely, but generally will be in the range of from about 0.01 to about 0.4 millimole per gram of the carrier.

The temperature at which the polymerization is carried out will depend upon the type of process used, but generally will be within the range of from about 0° C. to about 120° C., although higher or lower temperatures can be used. Any pressure, from subatmospheric to as high as 30 atmospheres or more, can be used.

The following examples will illustrate the process of polymerizing 1-olefins with the tetraneopentyltitanium catalyst of this invention.

EXAMPLE 2

A heptane solution of tetraneopentyltitanium, prepared as described in Example 1, was allowed to stand at room temperature for several days. The solution changed from yellow to dark green during this time. A portion of this solution, containing $1.0 \times 10^{-4}$ moles of the titanium compound, was injected into a polymerization vessel with an argon atmosphere and containing 300 ml. of purified heptane. After equilibrating at 80° C., the vessel was pressured with ethylene to 30 p.s.i.g. The reaction mixture was stirred for 4.5 hours at 80° C. after which the reactor was vented and cooled. The polyethylene so produced was separated by filtration and dried. It amounted to 3 g. per millimole of titanium compound, a rate of 0.4 g. per millimole of titanium per atmosphere per hour.

EXAMPLE 3

A microspheroidal silica gel was annealed at 700° C. for 48 hours, cooled and then was stored at room temperature in the absence of air. An 8.36 g. portion of this silica was redried under argon and then was treated with a solution of $1.14 \times 10^{-3}$ mole of the tetraneopentyltitanium, prepared in Example 1, in pentane. The pentane was vaporized to yield a yellow-colored catalyst having 0.66% titanium or 0.136 millimole of titanium compound per g. of silica. A sample of this catalyst, weighing 0.47 g., was placed in a 750 ml. reactor containing 300 ml. of heptane and an argon atmosphere. The vessel was closed, pressured with ethylene to 30 p.s.i.g., and the temperature was gradually increased. Near 50° C. polymerization began and that temperature was maintained for 67 hours. The reactor was then vented and cooled and the contents were filtered, yielding 8.3 g. of polyethylene which was 130 g. per millimole of titanium at a rate of 1.0 g./mmole/atm./hr.

EXAMPLE 4

The procedure of Example 3 was repeated except that the polymerization was run at 90° C. for 19 hours. The yield of solid polyethylene was 8.9 g. and 1.3 g. of soluble polymer was also obtained. This was equivalent to 160 g./mmole of titanium at a rate of 8.5 g./mmole/atom./hr.

EXAMPLE 5

The procedure of Example 3 was repeated except that an amount of ethylaluminum dichloride equal to 1 mole of aluminum per mole of titanium was added to the catalyst. Polyethylene was produced at the rate of 1.2 g./mmole/atm./hr.

EXAMPLE 6

The procedure of Example 3 was repeated except that an amount of triethylaluminum equal to 1 mole of aluminum per mole of titanium was added to the catalyst. Polyethylene was produced at the rate of 1.6 g./mmole/atm./hr.

EXAMPLE 7

A catalyst was prepared as described in Example 3, but the titanium content was lower, 0.12 millimole of tetraneopentyltitanium per gram of silica. Ethylene was polymerized by the procedure of Example 3 except that was injected into the polymerization mixture an amount of diethylaluminum chloride equal to 2 moles of aluminum per mole of titanium, 0.46 g. of the titanium on silica catalyst being used. The polymerization was run at 50° C. for 19 hours. The polyethylene so produced was 6.1 g. which was equivalent to 110 g./mmole of titanium at a rate of 2.8 g./mmole/atm./hr.

EXAMPLE 8

A 1.08 g. portion of the catalyst prepared in Example 3 was used to polymerize propylene by the procedure described in that example. The polymerization was carried out at 50° C. for 66 hours under 40 p.s.i.g. of propylene. There was obtained 1.8 g. of polypropylene which was equivalent to 12.2 g. per millimole of titanium.

EXAMPLE 9

The procedure of Example 8 was repeated except that an amount of diethylaluminum chloride equal to 8 moles of aluminum per mole of titanium was added at the start of the polymerization and the process was run for 19.7 hours. There was obtained 2.9 g. of polypropylene which was equivalent to 19.7 g. per millimole of titanium.

What I claim and desire to protect by Letters Patent is:

1. A polymerization catalyst comprising tetraneopentyltitanium extended on a solid support.
2. The catalyst of claim 1 wherein the solid support is silica.
3. The process of polymerizing 1-olefins which comprises contacting at least one 1-olefin with a catalyst comprising tetraneopentyltitanium.
4. The process of claim 3 wherein the tetraneopentyltitanium is extended on silica.
5. The process of claim 4 wherein the catalyst is activated by the addition of a dialkylaluminum halide.
6. The process of claim 5 wherein the dialkylaluminum halide is diethylaluminum chloride.
7. The process of claim 6 wherein ethylene is polymerized.
8. The process of claim 6 wherein propylene is polymerized.

References Cited
UNITED STATES PATENTS 3,712,874  1/1973  Kruse _____ 260—94.9 B
3,635,935  1/1972  Long _____ 260—94.9 B JOSEPH L. SCHOTER, Primary Examiner A. HOLLER, Assistant Examiner U.S. Cl. X.R.

252—428, 431 R; 260—88.2 B, 93.7, 94.9 DA